Figures 1, 2:
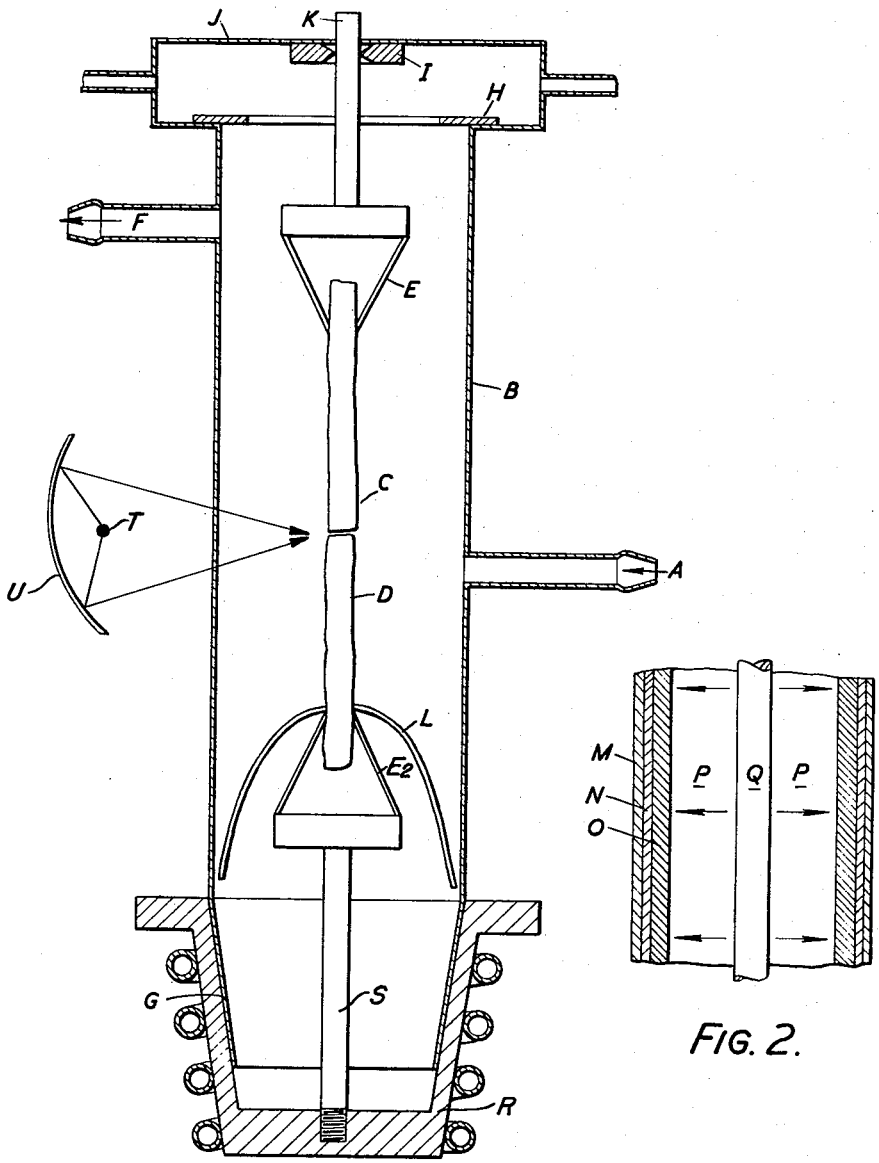

July 25, 1961 J. C. A. LEWIS 2,993,763
MANUFACTURING PROCESS FOR THE PREPARATION
OF FLAKES OF SINTERED SILICON
Filed Nov. 14, 1957

United States Patent Office 2,993,763
Patented July 25, 1961

2,993,763
MANUFACTURING PROCESS FOR THE PREPARATION OF FLAKES OF SINTERED SILICON
James C. A. Lewis, Blisworth, England, assignor to The Plessey Company Limited, Ilford, England, a British company
Filed Nov. 14, 1957, Ser. No. 696,566
3 Claims. (Cl. 23—223.5)

This invention relates to processes for the manufacture of semi-conductor materials.

Semi-conductor materials for use in rectifiers, transistors and the like are required to be prepared to exceptional standards in that the material must have an impurity content which is exceedingly low by ordinary standards.

The preparation of semi-conductor material to these requirements is a problem of considerable technical difficulty, and the present invention is concerned with the provision of a process by which a semi-conductor material of desired chemical composition can be obtained, and from or by which material of appropriate electrical properties can be obtained.

The semi-conductor material must include an additive the purpose of which is to produce the desired type and degree of conductivity in the semi-conductor. Such additives are also present in minute but precisely controlled quantities.

The semi-conductor material of desired conductivity can be obtained by first preparing the pure material, to a degree of purity greater than that of the final material, and incorporating the additives. The invention can be used to produce semi-conductor material of a degree of purity appropriate for this use.

The invention can also be used in connection with the production of a semi-conductor material, with appropriate additives, directly and without first preparing the pure semi-conductor material, as described in co-pending United States application Serial No. 696,567.

The present invention consists of a method of producing semi-conductor material which comprises thermally decomposing a gaseous compound of the material whilst maintaining an elevated temperature in the decomposition zone by means of an electrically heated element composed of semi-conductor material.

The invention also includes a method of preparing semi-conductor material which comprises thermally decomposing a gaseous compound of the material, including the steps of heating by external heating means an element composed of semi-conductor material which will be disposed in a decomposition zone, and thereafter maintaining said element at an elevated temperature by a current passed through it.

Features and advantages of the invention will appear from the following description of one embodiment thereof, given by way of example, in conjunction with the accompanying drawings in which:

FIGURE 1 is a diagrammatic view of a suitable form of apparatus for carrying out the invention, and FIGURE 2 is a schematic section of a portion of the decomposition chamber of the apparatus of FIGURE 1 showing the formation of the silicon deposited according to the invention.

I have found it convenient to produce the pure silane required for the method of the present invention by reacting a solution of ammonium bromide in liquid ammonia with powder magnesium silicide. A suitable apparatus for preparing and purifying silane according to this reaction is fully described herein.

Referring to FIGURE 1, high purity silane enters, at A, a high purity quartz decomposition chamber B and impinges on to two high purity silicon rods C and D. The upper end of the decomposition chamber B is sealed by means of a water-cooled metal end block J which has an annular rubber gasket joint H set into it so as to provide a vacuum tight seal between the joint J and the walls of the chamber B. The upper silicon rod C is held by a clamping means E, which is attached to a support rod K passing through the water cooled end block J. The rod K is slidably mounted in the end block and a seal between the rod K and the end block J is provided by a high vacuum rubber seal I. The lower end of the decomposition chamber B is provided with a ground quartz joint G which fits tightly into the metal cone R in a base provided for the apparatus. The lower silicon rod D is supported by a second clamping means $E_2$ attached to a rod S mounted in the metal base. The clamping means $E_1$ and $E_2$ and the rods K and S are preferably constructed of tungsten and a quartz shield L is provided around the lower silicon rod D and over the lower clamping means $E_2$ to prevent any silicon not adhering to the wall of the decomposition chamber from being contaminated by the tungsten clamping means $E_2$. The decomposition chamber B is also provided with an outlet F which is connected to a high vacuum pump (not shown).

In order that a current can be passed through the high purity silicon rods C and D to heat them to a suitable temperature at which decomposition of the silane will take place, the rods must first be heated from outside the chamber in order to raise their conductivity. High purity silicon rods usually have resistivities at least of the order of 50 ohms-cm. and with such a resistivity sufficient current cannot be passed through the rods to enable them to be heated to the required temperature. Suitable means for heating the rods C and D from outside the decomposition chamber B may comprise an infra-red source of rays which source is schematically shown at T which are directed on to the rods C, D by means of a parabolic or elliptical mirror U. The rays of infra-red radiation are schematically represented by lines with arrow heads. Alternatively, the silicon rods C and D may initially be heated by creating an arc between the rods in vacuum, then bringing the rods firmly into contact and passing a current of about 60 amps. through them via their metal holders, to raise their surface temperature to the desired value. Silane is then admitted, at A, into the evacuated chamber and the pressure adjusted to about .5 to 50 cm. Hg by means of control taps which regulate the flow in the tubes A and F. At this pressure very little surface reaction occurs and the silane decomposition is almost entirely a gas phase reaction. The silicon formed in this reaction is swept to the walls of the reaction chamber B where it is deposited, at first as a brown amorphous layer M, FIGURE 2. This amorphous layer then receives radiant energy P from the hot silicon rod Q which it absorbs well, and in consequence its temperature rises. A further temperature rise occurs as silane decomposes on the amorphous layer M, once its temperature has risen above about 450° C., since the reaction is exothermic. Thus subsequent layers N, O of deposited silicon become sintered due to these temperature rises. In this way large silvery-grey flakes of sintered silicon, approximately 4 to 8 sq. cms. in area by 2 to 4 mm. thick are produced; this material is preferable to a fine powder for crystal growth purposes.

It will be noted that the sintered silicon deposited is protected from reaction with, and impurity pick-up from, the quartz wall by the amorphous layer M which, since it is fairly loose, also allows the sintered material to be removed easily from the chamber with no contamination from the quartz walls. Only a little silane decomposes on the silicon rods at the above pressure and so they may be used again.

What I claim is:

1. A process for the preparation of flakes of sintered silicon, comprising heating a silicon element located within a decomposition chamber by heating means located externally of the chamber, feeding highly pure silane into the chamber, maintaining the pressure within the decomposition chamber within the range 0.5 to 50 centimetres Hg, thermally decomposing the silane by a gas phase reaction permitting the decomposed silane initially to form an amorphous layer of silicon on the walls of the decomposition chamber, permitting subsequent layers of decomposed silane deposited on the walls to be heated by heat radiation from the silicon element, and also permitting silane to decompose to silicon on the amorphous layer when the latter is at a temperature above 450° C. to produce exothermic temperature rise which sinters the silicon deposited on the amorphous layer.

2. A process for the preparation of flakes of sintered silicon, comprising heating a silicon element located within a decomposition chamber by heating means located externally of the chamber, feeding highly pure silane into the chamber, maintaining the pressure within the decomposition chamber within the range 0.5 to 50 centimetres Hg, thermally decomposing the silane by a gas phase reaction, permitting the decomposed silane initially to form an amorphous layer of silicon which is deposited upon the walls of the decomposition chamber, allowing gaseous silane to decompose on the amorphous layer when the latter is at a temperature above 450° C. to produce exothermic temperature increases which partially sinters the layers of silicon deposited on the amorphous layers and permitting the deposited silicon to be further heated by radiant energy from the heated silicon element so as further to sinter the deposited silicon thereby to form the flakes of sintered silicon.

3. A process for the preparation of flakes of sintered silicon, comprising feeding silane into a decomposition chamber, maintaining the pressure with the decomposition chamber within the range 0.5 to 50 centimetres Hg, heating the silane within the chamber by electric heating means located externally of the chamber to thermally decompose the silane by a gas phase reaction, permitting the decomposed silane to form an amorphous layer of silica on the walls of the decomposition chamber, heating said layer, and subsequent layers of decomposed silane by means of heat radiated from a silicon element located within the chamber, permitting gaseous silicon to decompose on the amorphous layer to produce exothermic temperature rise which assists in the sintering of the layers of silicon deposited on the amorphous layer, and simultaneously heating the silicon element so as further to sinter the deposited silicon.

References Cited in the file of this patent

UNITED STATES PATENTS

| | | |
|---|---|---|
| 2,768,074 | Stauffer | Oct. 23, 1956 |
| 2,793,103 | Emeis | May 21, 1957 |
| 2,854,318 | Rummel | Sept. 30, 1958 |

FOREIGN PATENTS

| | | |
|---|---|---|
| 745,698 | Great Britain | Feb. 29, 1956 |